United States Patent
Sharrah et al.

(10) Patent No.: US 7,220,013 B2
(45) Date of Patent: May 22, 2007

(54) RECHARGEABLE FLASHLIGHT AND BATTERY ASSEMBLY FOR SINGLE-HANDED INTERMITTENT AND CONTINUOUS OPERATION

(75) Inventors: Raymond L Sharrah, Collegeville, PA (US); Peter J. Ziegenfuss, Sellersville, PA (US)

(73) Assignee: Streamlight, Inc., Eagleville, PA (US)

( * ) Notice: Subject to any disclaimer, the term of this patent is extended or adjusted under 35 U.S.C. 154(b) by 0 days.

(21) Appl. No.: 10/753,216

(22) Filed: Dec. 19, 2003

(65) Prior Publication Data
US 2005/0135091 A1   Jun. 23, 2005

(51) Int. Cl.
F21L 4/00 (2006.01)

(52) U.S. Cl. ............ 362/183; 362/157; 362/171; 362/178; 362/184; 362/191; 362/202; 362/206; 429/7; 429/99; 429/170; 320/114; 320/115

(58) Field of Classification Search ............ 362/183, 362/157, 158, 171, 178, 184, 191, 202, 206; 429/99, 170, 7; 320/2, 3
See application file for complete search history.

(56) References Cited

U.S. PATENT DOCUMENTS

| | | | |
|---|---|---|---|
| 5,432,689 A | * | 7/1995 | Sharrah et al. ............ 362/183 |
| 5,486,432 A | * | 1/1996 | Sharrah et al. ............ 429/99 |
| 5,590,951 A | | 1/1997 | Matthews |
| 5,629,105 A | | 5/1997 | Matthews |
| 5,642,932 A | | 7/1997 | Matthews |
| 6,283,611 B1 | | 9/2001 | Sharrah et al. |
| 6,461,764 B1 | * | 10/2002 | Nakamura ............ 429/170 |
| 6,585,391 B1 | * | 7/2003 | Koch et al. ............ 362/205 |
| 2005/0128741 A1 | * | 6/2005 | Matthews et al. ......... 362/206 |

* cited by examiner

Primary Examiner—Stephen F Husar
Assistant Examiner—Meghan K. Dunwiddie
(74) Attorney, Agent, or Firm—Stephen H. Eland; Dann, Dorfman, Herrell and Skillman (57) ABSTRACT

A flashlight has a head assembly with a charging member extending laterally to an external charging contact and a barrel slidably housing a battery assembly. A tail assembly having a slidable actuating member is positioned in abutment with the battery assembly. A connection module is positioned in the head assembly, an has a continuous connection means for maintaining a continuous electrical connection between the charging member and the battery, and also intermittent connection mechanism for intermittenly connecting the battery with the lamp.

30 Claims, 6 Drawing Sheets

RECHARGEABLE FLASHLIGHT AND BATTERY ASSEMBLY FOR SINGLE-HANDED INTERMITTENT AND CONTINUOUS OPERATION

BACKGROUND

Rechargeable flashlights are known in which a flashlight containing a rechargeable battery is provided with a compatible charging unit which both holds the flashlight and charges the battery when the flashlight is positioned therein. As described in U.S. Pat. No. 5,432,689, it is desirable to provide such a flashlight and charger assembly wherein the body of the flashlight is not used as a conduction path for either side of a lamp circuit, so that mating parts of the flashlight may be provided with an anodized, enamel, or other finish, and do not require re-machining in order to provide a conductive path between finished mating parts.

In the use of flashlights by armed personnel, such as by policemen, it is desirable to provide a flashlight that can be gripped and intermittently actuated with a single hand. For example, it is desirable to provide an actuator at the rear end of such a flashlight, so that the flashlight may be gripped with the fingers of one hand, and the actuator can be operated by the thumb of the same hand. However,locating a switch mechanism at the rear end of the flashlight while maintaining a construction which does not utilize the body of the flashlight as a conducting member, and in which a continuous connection is maintained between the battery terminals and a pair of external charging contacts presents design difficulties for which no solution is suggested in the above-referenced U.S. Pat. No. 5,432,689.

SUMMARY OF THE INVENTION

In accordance with one aspect of the present invention, a rechargeable flashlight is provided in which a the flashlight is charged by two charging contacts located on or near the forward end of the flashlight. The flashlight is configured to provide intermittent single-handed operation of the lamp circuit, and optionally to provide continuous switched operation. Continuous electrical contact between respective battery terminals located at the forward end of a battery assembly, and a pair of external charging contacts, is maintained by a configuration of springs mounted to a connection member located in the forward end of the flashlight. The connection springs extend rearwardly from the connection module to maintain contact with the battery terminals, while also urging the battery assembly rearwardly within the flashlight. A spring loaded plunger located in the connection module is also biased rearwardly, and aligned with a terminal of the battery assembly and with an electrical contact on a lamp base. The tail of the flashlight includes a slide member, having an actuation surface at the rear of the flashlight, for urging the battery assembly in the forward direction within the flashlight barrel, and further urging the plunger toward the lamp base contact. Hence, intermittent operation of the lamp is provided. In a preferred embodiment, continuous operation of the lamp is provided by configuring the tail assembly to hold the slide member at a forwardly-advanced position in the rear of the barrel.

BRIEF DESCRIPTION OF THE DRAWINGS

The foregoing Summary, as well as the following Detailed Description, will be best understood in connection with the attached drawings in which.

DETAILED DESCRIPTION OF THE DRAWINGS

Figure 1:
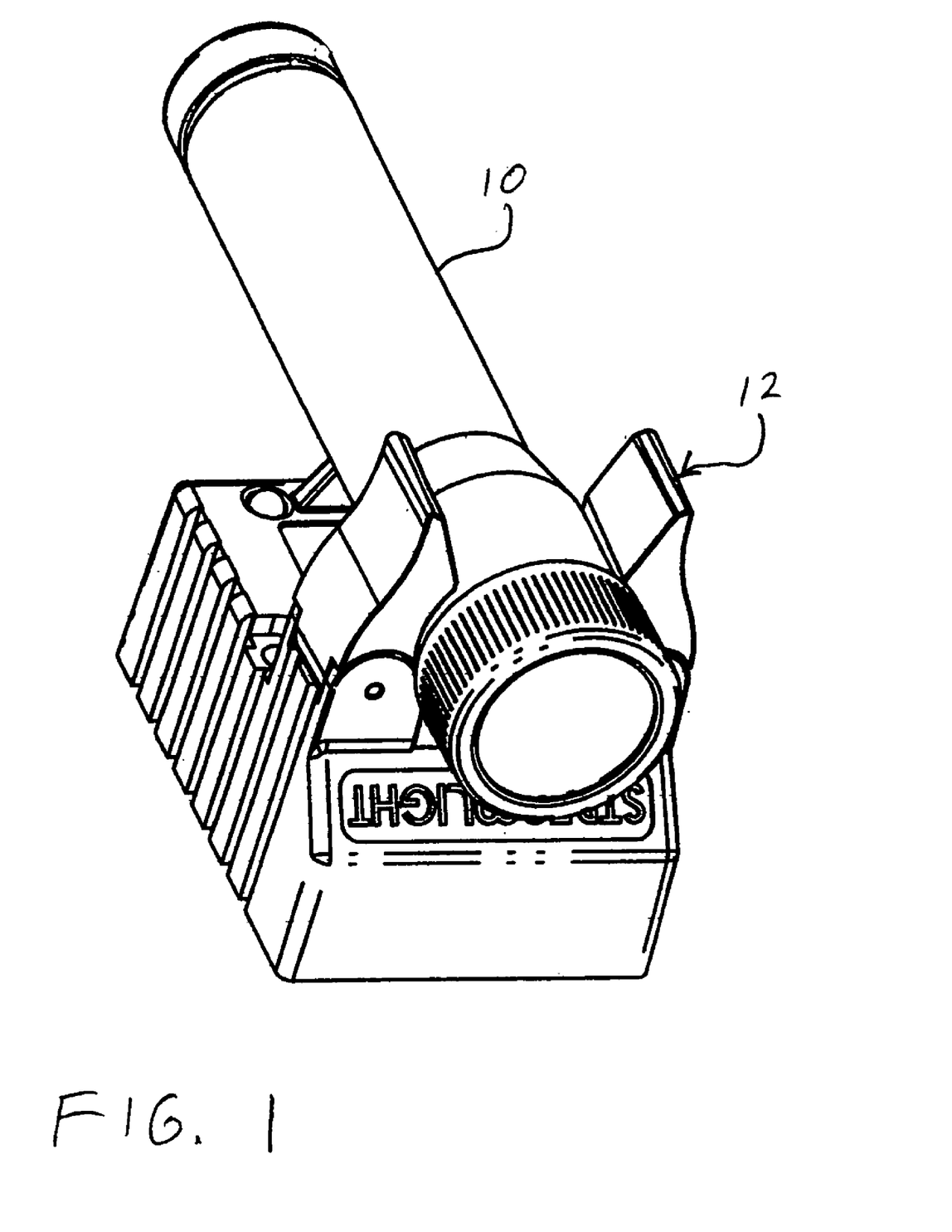
FIG. 1 is a perspective view of a flashlight and charger in accordance with the present invention.
Figure 2:
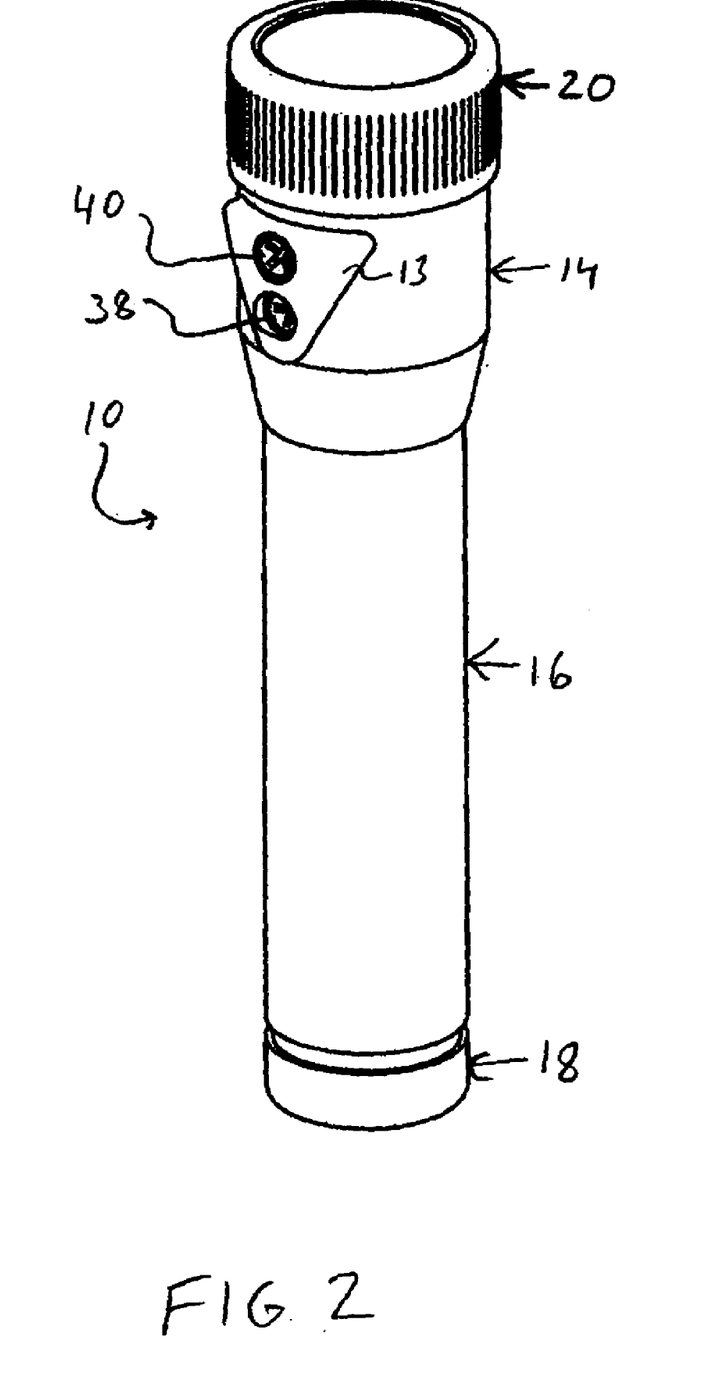
FIG. 2 is a perspective view of the flashlight of FIG. 1 removed from the charger.

Referring now to FIG. 1, the flashlight 10 is shown engaged within a charger 12. The charger 12 is substantially identical in construction with the charger shown in U.S. Pat. No. 5,432,689, which is incorporated by reference herein in connection with the charger assembly. Referring to FIG. 2, the flashlight 10 comprises a head assembly 14 connected with the forward end of a barrel 16. A tail assembly 18 is connected with the rear end of the barrel. A guide plate 13 is positioned on the exterior of the head assembly 14 for guiding the flashlight into the charger. Positioned within the guide plate are a pair of charging contacts 40 and 38, for mating with compatible connecting contacts located in the charger.

Figure 3:
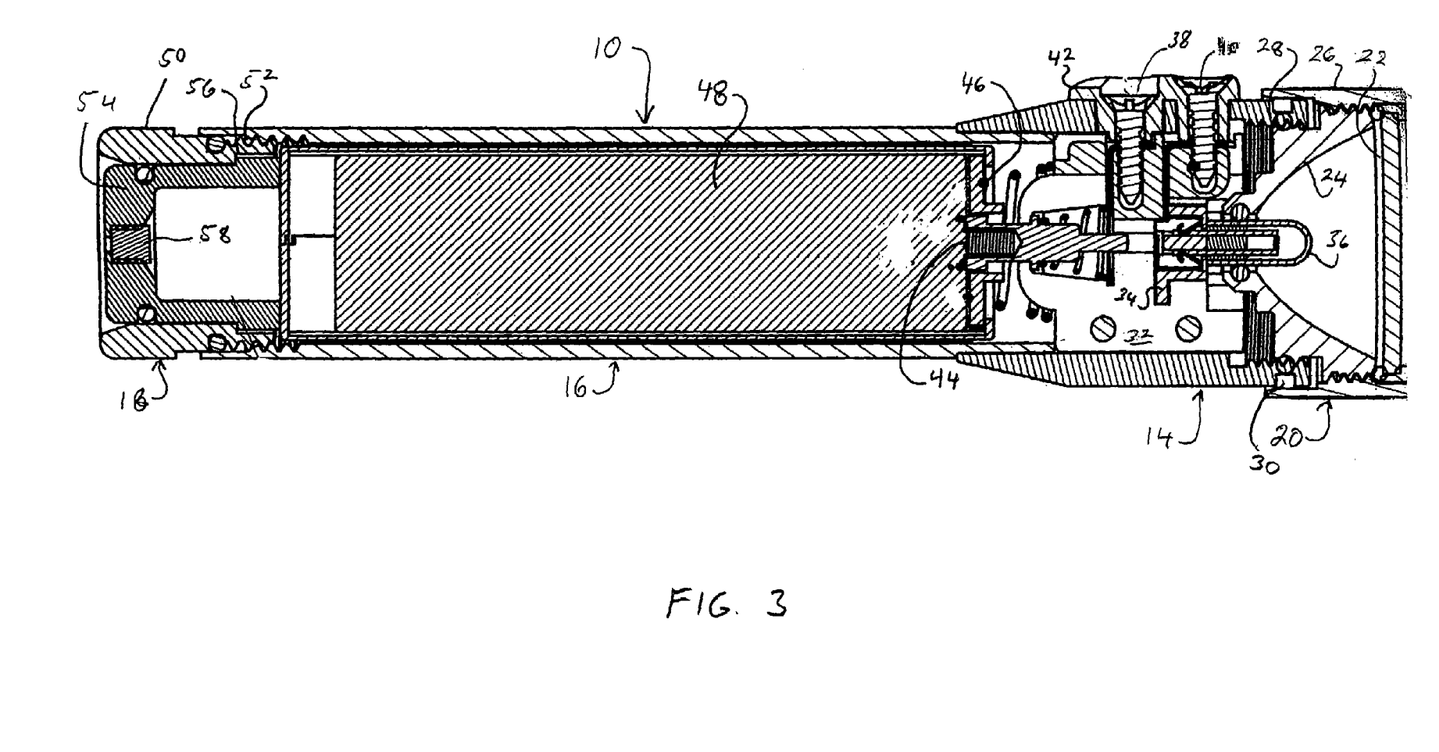
FIG. 3 is a cross-sectional view of the flashlight of the invention.

The forward end of the flashlight is formed by a facecap assembly 20 which is rotatably mounted at the forward portion of the head assembly 14. Referring now to FIG. 3, the facecap assembly 20 holds a circular lens 22 and a reflector 24 within a cylindrical carrier 26. The terminal rear portion of the reflector has threads 28 formed thereon to provide a threaded connection with a forward portion of the head assembly 14. The outer surface of the facecap assembly 20 is preferably knurled to provide a gripping surface thereon, so that the facecap assembly 20 can be rotated to move the facecap assembly 20 in the forward or reverse directions upon the threads 28 to vary the focus of the flashlight. An o-ring is positioned within a chase 30 formed about the outer surface of the forward end of the head assembly 14 to provide a fluid seal between the head assembly 14 and the facecap assembly 20.

A connection module 32 is positioned within the head assembly 14. Described in greater detail hereinbelow, the connection module 32 supports a lamp holder 34, in which a bi-pin lamp 36 may be inserted as shown. The The connection module 32 provides continuous electrical connection between battery terminals 44 and 46 and respective ones of a pair of contact screws 38 and 40, which extend from the exterior surface of the flashlight 10 through a charger alignment plate 42 and into the connection module 32 positioned in the interior of the head assembly 14. The connection module further provides a switchable electrical connection between the battery terminals 44 and 46 and respective terminals of the bi-pin lamp 36.

The rear portion of the head assembly 14 is press-fit for permanent engagement onto the forward end of the barrel 16. A battery assembly 48 is housed within the barrel 16. As described further hereinbelow, the battery assembly has respective negative and positive contacts 44 and 46 both positioned at the forward end thereof within the barrel 16.

A tail assembly 18 is connected with the rear of the barrel 16. The tail assembly comprises a cylindrical tail housing 50 having threads 52 formed about the exterior forward end thereof to provide a threaded connection with the interior rear portion of the barrel 16. A cylindrical slide member 54 is slidably positioned within the tail assembly 18. The forward end of the slide member 54 is enlarged so that the slide member is captured against rearward movement by a reduced diameter rim 56 formed in the tail housing 50. The slide member 54 is preferably hollow to provide storage space for a spare lamp (not shown), and is closed at the rear end thereof. A semi-permeable filter member 58 is positioned within a hole extending through the rear wall of the slide member 54, in order to vent gases from within the flashlight.

Figure 4:
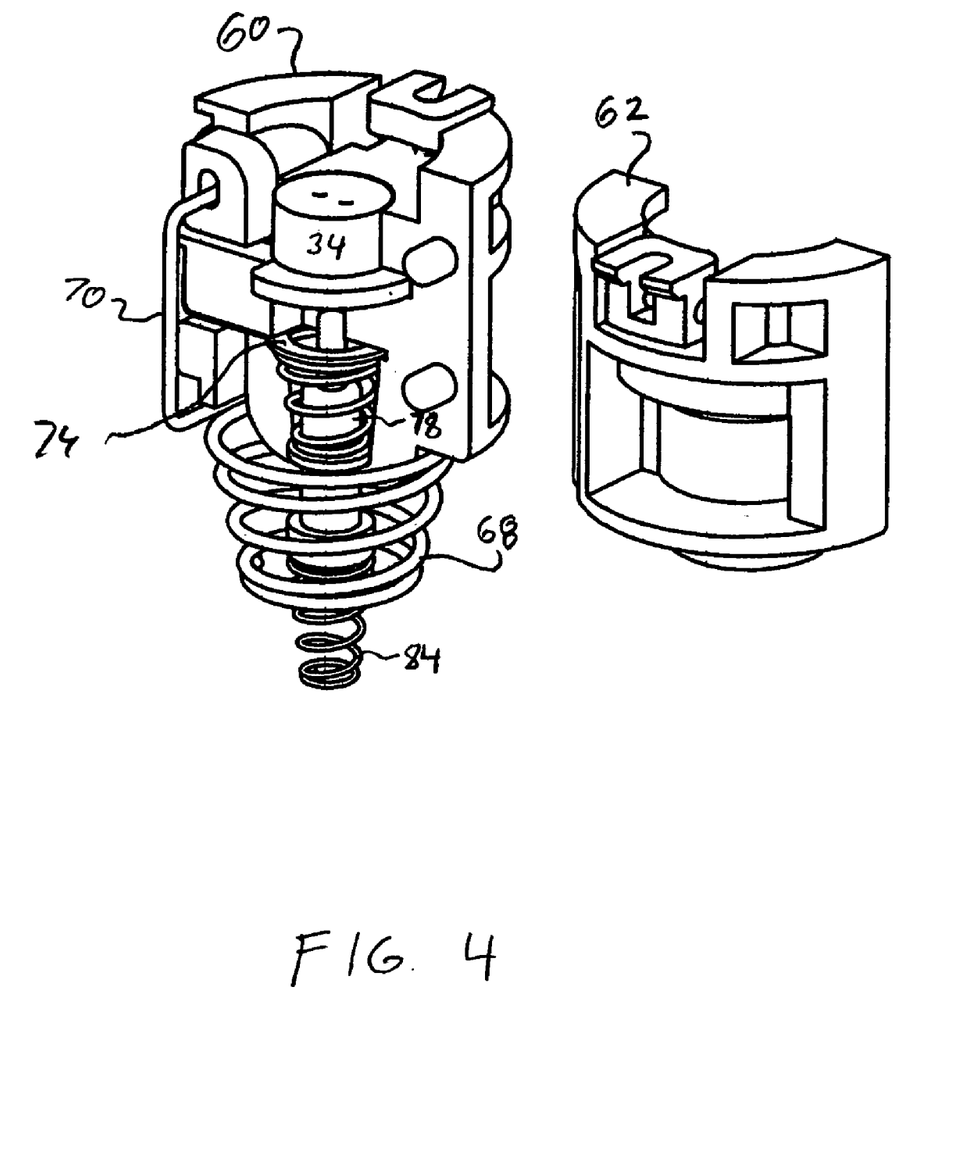
FIG. 4 is an exploded view of a connection module located within the head of the flashlight of FIG. 3.
Figure 5:
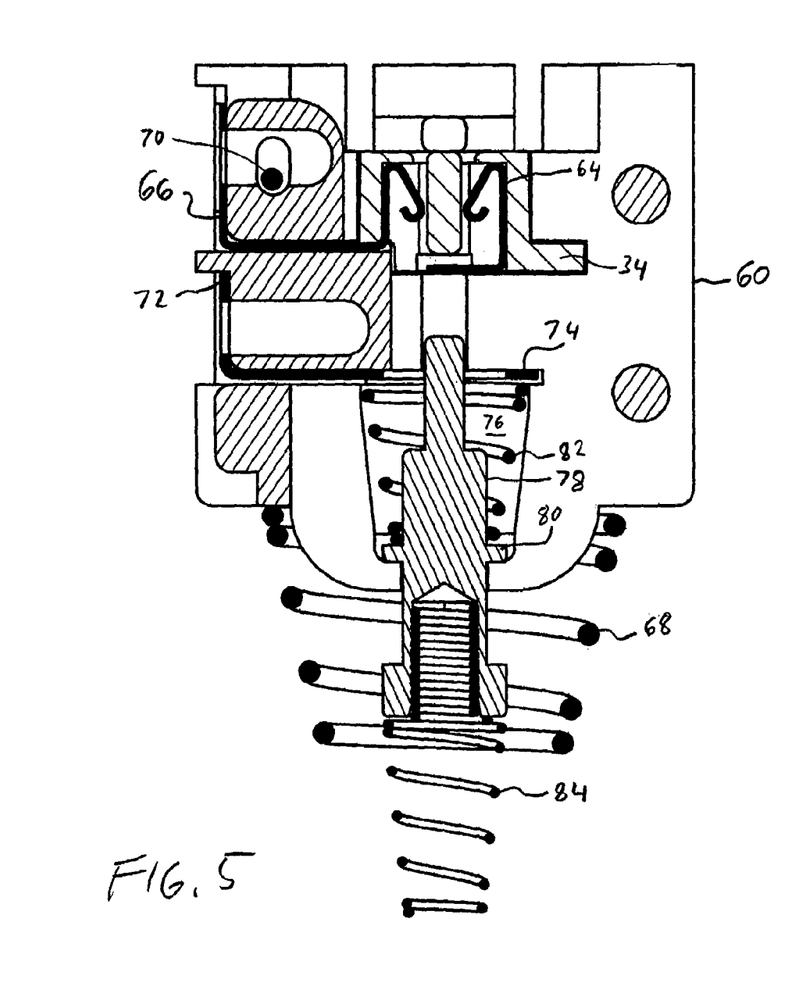
FIG. 5 is a cross-sectional view of the connection module of FIG. 4.

More views of the connection module 32 are shown in FIG. 4 and FIG. 5. The connection module 32 comprises two clamshell housing pieces 60 and 62. The housing pieces 60 and 62 are formed to capture several conductive components therein as follows. The lamp base 34 fits within a recess formed between the two housing pieces 60 and 62. The lamp base is preferably composed of a liquid crystal polymer material having relatively high heat resistance to act as a barrier to heat generated by the lamp and to provide a heat shield for the connection module. The connection module 32 may be made of an acetol polymer material such as DEL-RIN, which provides suitable mechanical performance for moving parts situated therein. On the rear surface of the lamp base 34, there is provided a conductive contact member 64 for the positive terminal of the lamp circuit. Extending from one side of the lamp base 34, and held within a recess formed in the housing pieces, a negative contact member 66 extends within the connection module toward the side of the module. A terminal portion of the contact member is bent upward and has a receiving ring formed therein to connect with the negative contact screw 40. A conical spring 68 is positioned to extend from the rear of the connection module 32 to connect with the negative terminal of the battery assembly. The conical spring 68 has a contact arm portion 70 that runs through the connection module to connect with the negative contact member 66. When the flashlight is assembled with the battery assembly in place, continuous compressive contact is maintained between the negative terminal at the forward end of the battery and the conical spring 68, so that a continuous charging connection is provided between the negative contact screw and the negative terminal of the battery.

A positive contact member 72 has a ring portion for connecting with the positive contact screw. The positive contact member is positioned in the connection module and extends to provide a circular contact ring 74 which is aligned within the connection module at a position to the rear of the lamp base 34. A plunger cavity 76 is formed in the rear of the connection module between the clamshell pieces 60 and 62. A plunger 78 is slidably captured in the connection module by a rim 80 formed thereon. A rear portion of the plunger 78 extends out of the rear of the connection module. Within the plunger cavity 76, a spring 82 is compressed between the rim 80 and the rear of the circular contact ring 74. Outside of the plunger cavity, the rear of the plunger 78 connects with a spring 84 that extends rearwardly from the connection module to connect with the positive terminal of the battery assembly. The spring 84 is thus maintained in continuous compressive contact with the positive terminal of the battery, so that at all times a conductive path is provided between the positive terminal of the battery and the positive charging contact on the exterior of the flashlight.

The plunger 78 has a tip portion aligned with the rear of the lamp base 34, and the positive lamp contact thereon. The plunger is urged rearwardly within the plunger cavity 76, by the spring 82, SO that in a first position, the tip of the plunger 78 is maintained out of contact with the positive lamp contact. Referring again to FIG. 3, it can be seen that by depressing the slide member 54 into the rear of the tail assembly, the slide member 54 urges the battery assembly forward within the barrel 16. Thus, when the slide member 54 is so depressed, the movement of the battery assembly compresses both springs 84 and 82, to urge the tip of the plunger into contact with the positive lamp contact on the rear of the lamp base. The lamp may therefore be intermittently switched on and off by holding the flashlight in the fingers of one hand, and depressing the slide member with the thumb of the same hand.

To maintain the lamp in a continuous "on" condition, the tail housing 50 may be rotated into the rear of the barrel on the threads 52, so that the springs 84 and 82 are again compressed to move the plunger tip into contact with the positive lamp contact. Thus, the configuration herein described provides intermittent or continuous switching of the lamp.

Figure 6:
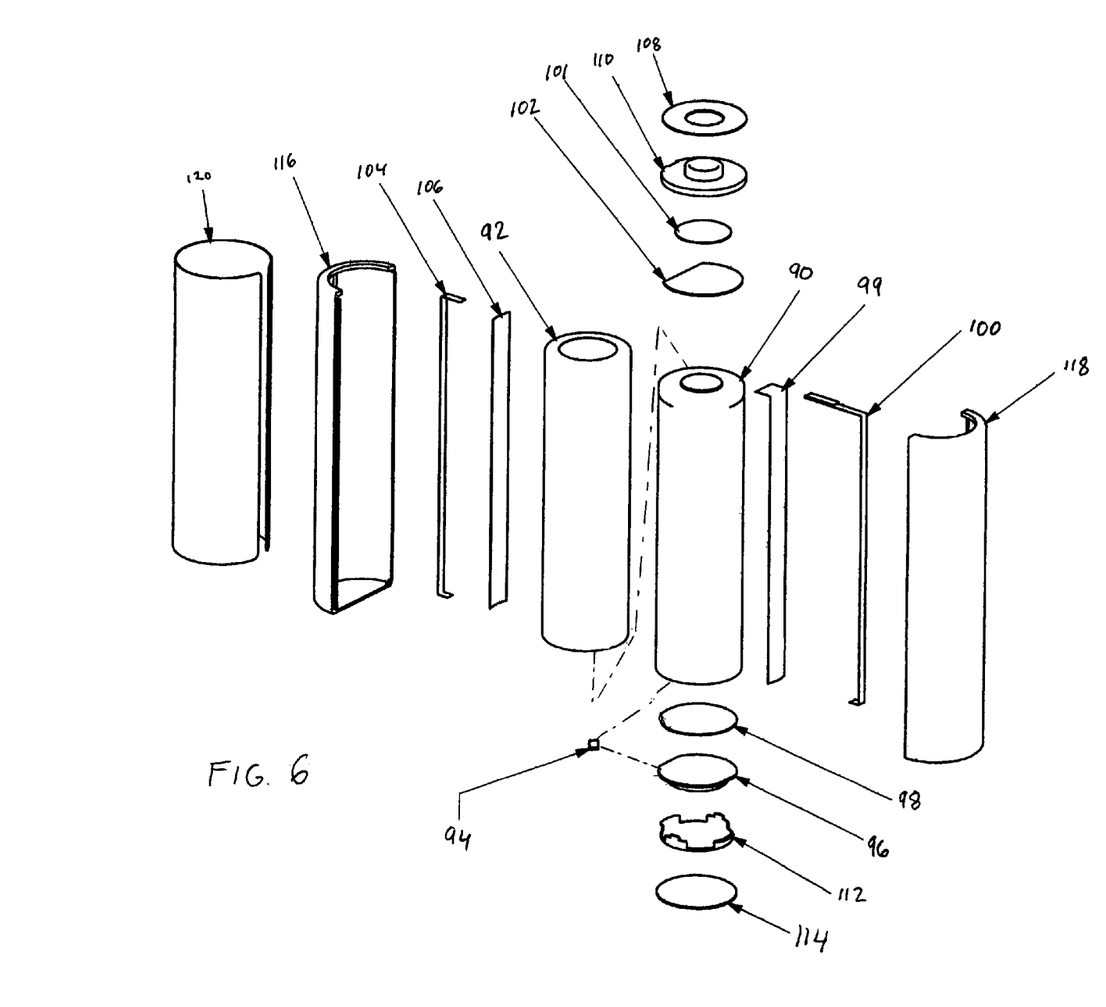
FIG. 6 is an exploded view of a battery assembly utilized in the flashlight of FIG. 3.

The battery assembly is shown in an exploded view in FIG. 6. The preferred cell for the battery is a Lithium-ion rechargeable cell. The battery assembly provides two battery terminals 108 and 101 exposed at the forward end thereof in a concentric arrangement as viewed from the forward end. The use of Li-ion cells in consumer products generally requires the use of an battery protection circuit in series therewith, due to the high energy density and potential volatility of Li-ion cells. The battery protection circuit disconnects the Li-ion cell from the lamp circuit from further charging when the cell is fully charged, and also disconnects the cell from the lamp circuit when the charge is depleted below a predetermined threshold. The battery assembly is constructed as follows. A Li-ion rechargeable cell 90 is first provided with a shrink-wrap insulating jacket 92. A conductive strap 94 is connected with the cell contact at the negative end of the cell and with a protection circuit board 96. An insulating spacer 98 is positioned between the rear of the cell 90 and the forward side of the circuit board 96. A length of insulating tape 99 is applied to one side of the jacket 92, and a conductive strap 100 is connected with the circuit board 96 at the rear of the assembly, and extends to the forward end of the assembly for connection to the positive cell contact at the forward end. The forward end of the strap 100 extends across the positive cell contact, and then connects with a positive battery contact terminal member 101. The strap 100 is bent backwards, and an insulating spacer 102 is positioned between the positive contact of the cell and the positive contact terminal member.

On the other side of the jacket 92, another strap 104 is connected to the negative cell contact, and is positioned over an insulating strip 106 positioned on that side of the jacket. The forward end of the strap 104 is connected to an annular negative battery contact terminal 108 at the forward end of the cell. The annular negative terminal 108 is positioned on an insulating member 110 which has a hollow cylindrical vertical extension formed therein for guiding the spring into contact with the positive contact terminal 101.

A disk-shaped low-profile housing 112 is placed over the rear side of the protection circuit, and an insulating spacer 114 is placed on the rear side of the housing, to mechanically protect the protection circuit. Finally, the sheathed cell, strap, and protection circuit arrangement is enclosed in a rigid plastic shell formed by shell members 116 and 118. The shell is closed at the rear end, and is open at the forward end to permit the springs to connect with the respective contacts. An adhesive label 120 may be placed over the shell to hold the shell members together.

The terms used here and above are intended by way of exemplary description, and not of limitation. There is no intent for such terms of description to otherwise limit the scope of the appended claims.

The invention claimed is:

1. A flashlight, comprising a head assembly, having a lamp and having a charging member extending laterally to an external charging contact;
   a barrel slidably housing a battery;
   a tail assembly having a slidable actuating member positioned therein in abutment with the battery; and
   a connection module positioned in the head assembly, having a continuous connection for maintaining a continuous electrical connection between the charging member and the battery, and further having an intermittent connection element for intermittently connecting the battery with the lamp in response to sliding the actuating member wherein the intermittent connection between the lamp and the battery is along an electrical path that is separate from the barrel.

2. The flashlight of claim 1 wherein the continuous connection comprises a first spring extending rearwardly from the connection module toward the battery assembly.

3. The flashlight of claim 2, wherein the intermittent connection element comprises a plunger slidably positioned in the connection module and in contact with the first spring, and a second spring positioned in the connection module and biasing the plunger rearwardly.

4. The flashlight of claim 3, comprising a lamp base for holding the lamp; the lamp base having an electrical contact member positioned thereon for contact with the plunger when the actuating member is operated to slide the battery assembly in the forward direction within the barrel.

5. The flashlight of claim 4 wherein the lamp base is configured to provide a heat shield for the connection module.

6. A battery assembly for a rechargeable flashlight, comprising:
   a rechargeable cell having respective cell contacts at opposite ends thereof;
   an insulating jacket positioned around the exterior of the cell;
   a protection circuit connected with one cell contact and positioned adjacent one end of the cell;
   a mechanically-protective housing positioned over the protection circuit at said one end of the cell,
   a first conducting strap connected with the other cell contact and extending along the exterior of the insulating jacket to connect with the protection circuit;
   a second conducting strap connected with the protective circuit and extending along the exterior of the insulating jacket to the other end of the cell;
   a first battery terminal member connected with the first conducting strap at said other end of the cell; and
   a second battery terminal member connected with the second conducting strap at said other end of the cell.

7. The battery assembly of claim 6, wherein the second battery terminal member comprises an annular ring, and wherein the battery assembly further comprises an insulating member having a disk portion for positioning the annular ring at said other end of the cell, and wherein said insulating member has an opening formed therein for permitting contact with the first battery terminal member through said opening located at the center of said annular ring.

8. The battery assembly of claim 6, further comprising a rigid outer jacket for abutment with a slidable actuating member for urging said battery assembly in the forward direction when positioned within a flashlight barrel against a spring, to permit intermittent actuation of a lamp circuit.

9. The battery assembly of claim 7 comprising a vertical guide member for guiding a spring into contact with the first battery terminal member.

10. The flashlight of claim 1 wherein the tail assembly comprises a cap connected to the barrel, and the actuating member is slidable relative to the cap.

11. The flashlight of claim 1 comprising a second external charging contact and an electrical path from the battery to the external charging contacts, wherein the entire electrical path from the battery to the external charging contacts is formed separate from the barrel.

12. The flashlight of claim 1 wherein the barrel is separated from electrical communication with the battery.

13. The flashlight of claim 1 wherein the intermittent connection element is displaceable in response to displacement of the battery.

14. A flashlight, comprising:
   a body;
   a battery slidable within the body;
   a lamp assembly connected to a forward end of the body, comprising a lamp element;
   first and second external charging contacts cooperable with a charging unit;
   a continuous charging path operable to maintain a continuous electrical connection between the charging contacts and the battery wherein the continuous charging path does not include the body; and
   a switch disposed adjacent the rearward end of the body, remote from the lamp assembly.

15. The flashlight of claim 14 wherein the switch is operable to turn the flashlight on and off.

16. The flashlight of claim 14 wherein the body has a longitudinal axis and the charging contacts extend laterally relative to the longitudinal axis.

17. The flashlight of claim 14 wherein the switch comprises an element that is axially displaceable in response to axial displacement of the battery to switch the lamp element on and off.

18. The flashlight of claim 14 comprising a cap connected to the body at a rearward end of the body, remote from the lamp assembly, and an actuating member axially displaceable relative to the cap, wherein axially displacing the actuating member is operable to displace the battery axially.

19. The flashlight of claim 18 comprising a biasing element biasing the battery toward the actuating member.

20. The flashlight of claim 14 wherein the switch comprises an axially displaceable contact in continuous electrical communication with the battery, wherein the lamp assembly comprises a contact that is selectively engageable with the displaceable contact, wherein the displaceable contact is displaceable in response to displacement of the battery.

21. The flashlight of claim 14 wherein the flashlight comprises a first spring biasing the battery and forming a portion of the electrical path from the battery to one of the external charging contacts, and wherein the axially displaceable contact is disposed within the first spring.

22. The flashlight of claim 14 comprising an electrical path between the battery and the lamp wherein when the switch is in an on position the electrical path is continuous and when the switch is in an off position the electrical path is discontinuous.

23. The flashlight of claim 14 wherein the electrical path between the battery and the lamp is separate from the body so that the body does not form a portion of the electrical path.

24. A flashlight, comprising:
- a body;
- a battery slidable within the body between a first position and a second position;
- a lamp assembly connected to a forward end of the body, comprising a lamp element;
- first and second external charging contacts cooperable with a charging unit;
- a charging path operable to maintain an electrical connection between the charging contacts and the battery; and
- a switch comprising an axially displaceable element operable to displace the battery from the first position to the second position, wherein in the first position the battery is connected with the lamp and in the second position the battery is disconnected from the lamp.

25. The flashlight of claim 24 wherein the charging path is a continuous path providing a continuous charging path when the battery is in both the first position and the second position.

26. The flashlight of claim 24 wherein the body has a longitudinal axis and the charging contacts extend laterally relative to the longitudinal axis.

27. The flashlight of claim 24 comprising an electrical path between the lamp and the battery wherein the electrical path is separate from the body.

28. The flashlight of claim 24 wherein the switch comprises a cap connected to the body at a rearward end of the body, remote from the lamp assembly, and the switch actuating element is axially displaceable relative to the cap, wherein axially displacing the actuating member is operable to displace the battery axially.

29. The flashlight of claim 24 comprising a biasing element biasing the battery toward the actuating element.

30. The flashlight of claim 24 wherein the switch comprises an axially displaceable contact in continuous electrical communication with the battery, wherein the lamp assembly comprises a contact that is selectively engageable with the displaceable contact, wherein the displaceable contact is displaceable in response to displacement of the battery.

* * * * *